3,086,988
2 - HYDROXY - 4 - (2 - HYDROXYALKOXY)BENZO-
PHENONES AND THEIR LOWER ALKANOIC
ACID ESTERS
David A. Gordon, Midland, Mich., assignor to The Dow
Chemical Company, Midland, Mich., a corporation of
Delaware
No Drawing. Filed July 12, 1961, Ser. No. 123,422
6 Claims. (Cl. 260—488)

The present invention is directed to the 2-hydroxy-4-(2-hydroxyalkoxy)benzophenones and their lower alkanoic acid esters characterized by the formula

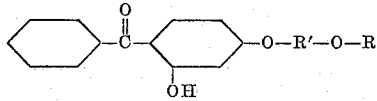

In this and succeeding formulae, R represents a lower alkanoyl radical or hydrogen and R' represents ethylene, propylene or trimethylene. The expression "lower alkanoyl" is employed in the present specification and claims to refer to the alkanoyl radicals containing not to exceed 5 carbon atoms. These novel compounds are crystalline solid materials which are somewhat soluble in many common organic solvents and of low solubility in water. The compounds are useful as herbicides and pesticides and are adapted to be employed as active toxic constituents in compositions for the control of many plants, mites, insects and bacterial and fungal organisms such as flies, worms, aphids, beetles and millet. The compounds are also useful as stabilizers in plastic materials such as the polyolefins.

The 2 - hydroxy - 4 - (2 - hydroxyalkoxy)benzophenones of the present invention are prepared by reacting 2,4-dihydroxybenzophenone with an alkylene halohydrin such as ethylene halohydrin, propylene halohydrin and 1,3-trimethylene halohydrin in the presence of an alkali metal hydroxide. The reaction conveniently is carried out in water or an organic solvent such as ethanol, dioxane or dimethyl formamide as reaction medium. Good results are obtained when employing substantially equimolecular proportions of the 2,4-dihydroxybenzophenone, alkylene halohydrin and alkali metal hydroxide. The reaction takes place readily at temperatures up to the boiling temperature of the reaction medium, and preferably at the temperature range of from 20° to 150° C. with the production of the desired 2-hydroxy-4-(2-hydroxyalkoxy) benzophenone product and halide of reaction. This halide appears in the reaction mixture as alkali metal halide.

In carrying out the reaction, the reactants are contacted and mixed together in any convenient fashion and maintained for a period of time in the reaction temperature range to insure completion of the reaction. Following the reaction, the product may be extracted with a suitable solvent and the solvent separated by evaporation or distillation under reduced pressure to obtain the desired product as a residue. This product may be further purified by conventional procedures such as washing with water, extraction and recrystallization.

The 2 - (4 - benzoyl - 3 - hydroxyphenoxy)alkyl alkanoates of the present invention may be prepared by reacting a 2-hydroxy-4-(2-hydroxyalkoxy)benzophenone as above prepared with a lower alkanoic acid. The reaction conveniently is carried out in an organic liquid such as toluene, benzene, methylene chloride, dichlorobenzene and methylcyclohexane as reaction medium and in the presence of an esterification catalyst such as a mineral acid, benzene sulfonic acid or a cation exchange resin in the acid form. Good results are obtained when employing substantially equimolecular proportions of the 2-hydroxy-4-(2-hydroxyalkoxy)benzophenone and alkanoic acid and a catalytic amount of the esterification catalyst. The esterification reaction takes place smoothly at the temperature range of from 40° ot 170° C. with the production of the desired ester compound and water of reaction. In carrying out the reaction, the reactants and catalyst, if employed, are mixed together in any convenient fashion and the resulting mixture maintained for a period of time in the reaction temperature range to effect and insure the completion of the reaction. Upon completion of the reaction, the desired product is separated and purified by conventional procedures such as removing the reaction medium by fractional distillation. In a convenient method, the reaction mixture is diluted with a solvent such as a petroleum ether to precipitate the desired product as a crystalline solid. The solid is separated by filtration and can be recrystallized from suitable solvents to effect further purification.

The following examples merely illustrate the invention and are not to be construed as limiting.

Example 1.—2-Hydroxy-4-(2-Hydroxyethoxy) Benzophenone

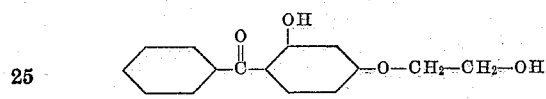

Ethylene bromohydrin (125 gram; 1 mole) is added portionwise with stirring to a mixture consisting of 214 grams (1 mole) of 2,4-dihydroxybenzophenone and 40 grams (1 mole) of sodium hydroxide dispersed in 500 milliliters of water. The addition is carried out over a period of 45 minutes and at a temperature of about 70° C. Stirring is thereafter continued and the temperature of the reaction mixture raised to 90° C. and maintained thereat for 1.5 hours to insure completion of the reaction. Following the reaction, the mixture separates into an aqueous layer and an organic layer. The organic layer is separated by decantation, extracted with methyl isobutyl ketone and washed with water. The solvent is thereafter removed from the organic layer by vacuum distillation to obtain a 2-hydroxy-4-(2-hydroxyethoxy)benzophenone product as a residue. This product is treated with charcoal and recrystallized from methanol. The recrystallized product melts at 93.5° to 95.5° C.

Example 2.—2-(4-Benzoyl-3-Hydroxyphenoxy) Ethyl Acetate

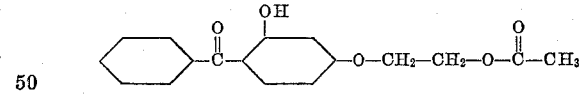

2 - hydroxy - 4- (2 - hydroxyethoxy)benzophenone (92 grams; 0.356 mole), 60 grams (1.0 mole) of glacial acetic acid, 200 milliliters of toluene and 10 drops of concentrated sulfuric acid are mixed together and heated at the boiling temperature. The heating is carried out over a period of about 16 hours and with the distillation of the water of reaction as formed. The reaction mixture is then diluted with 750 milliliters of a petroleum ether boiling at from 60° to 70° C. During the dilution, a 2-(4-benzoyl-3-hydroxyphenoxy)ethyl acetate product precipitates in the reaction mixture and is separated by filtration. This product is recrystallized from the aforementioned solvent and found to melt at 87.5° to 87.9° C.

In a similar manner, other products of the present invention are prepared as follows:

2 - hydroxy - 4 - (2 - hydroxypropoxy)benzophenone (molecular weight of 269; carbon and hydrogen contents of 70 percent and 6 percent) by reacting together 2,4-dihydroxybenzophenone, propylene chlorohydrin and sodium hydroxide.

2 - hydroxy - 4 - (3 - hydroxypropoxy)benzophenone (molecular weight of 273; carbon and hydrogen contents of 71 percent and 6.5 percent) by reacting together 2,4-dihydroxybenzophenone, 1,3-trimethylene chlorohydrin and potassium hydroxide.

2 - (4 - benzoyl - 3 - hydroxyphenoxy - 1 - methylethyl butyrate (molecular weight of 340; carbon and hydrogen contents of 70 percent and 6.6 percent) by reacting together 2 - hydroxy - 4 - (2 - hydroxypropoxy)benzophenone and butyric acid.

3 - (4 -benzoyl - 3 - hydroxyphenoxy)propyl propionate (molecular weight of 330; carbon and hydrogen contents of 70 percent and 6.2 percent) by reacting together 2-hydroxy-4-(3-hydroxypropoxy)benzophenone and propionic acid.

2 - (4 - benzoyl - 3 -hydroxyphenoxy)ethyl pentanoate (molecular weight of 344; carbon and hydrogen content of 70 percent and 6.4 percent) by reacting together 2-hydroxy - 4 - (2 -hydroxyethoxy)benzophenone and pentanoic acid.

2 - (4 - benzoyl - 3 - hydroxyphenoxy)ethyl propionate (molecular weight of 315; carbon and hydrogen contents of 69 percent and 6.0 percent) by reacting together 2-hydroxy-4-(2-hydroxyethoxy)benzophenone and propionic acid.

2 - (4 - benzoyl - 3 - hydroxyphenoxy) - 1 - methylethyl acetate (molecular weight of 312; carbon and hydrogen contents of 67 percent and 5.6 percent) by reacting together 2-hydroxy-4-(2-hydroxypropoxy)benzophenone and glacial acetic acid.

The novel compounds of the present invention are useful as herbicides and parasiticides for the control of a number of pests. For such uses, the products are dispersed on an inert finely divided solid such as chalk or talc or a finely divided solid surface active dispersing agent and the resulting products employed as dusts. Such mixtures may also be dispersed in water with or without the aid of a surface active agent and employed as sprays. In other procedures, the products are employed as active constituents in solvent solutions, oil-in-water or water-in-oil emulsions or aqueous dispersions. In representative operations, aqueous compositions containing 500 parts per million by weight of 2-hydroxy-4-(2-hydroxyethoxy) benzophenone give complete controls of flies and German millet. In additional operations, very excellent light and tensile strength properties are contributed to plastic materials such as polyolefins or haloethylene polymers by the inclusion therein of the products of the present invention at concentrations of 2 percent by weight.

I claim:

1. A compound corresponding to the formula

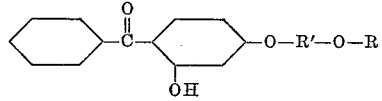

wherein R represents a mmeber of the group consisting of hydrogen and lower alkanoyl containing not to exceed 5 carbon atoms and R' represents a member of the group consisting of ethylene, propylene and trimethylene.

2. 2-hydroxy-4-(2-hydroxyethoxy)benzophenone.
3. 2-(4-benzoyl-3-hydroxyphenoxy)ethyl acetate.
4. 2-(4-benzoyl-3-hydroxyphenoxy)ethyl propionate.
5. 2-hydroxy-4-(3-hydroxypropoxy)benzophenone.
6. 2-hydroxy-4-(2-hydroxypropoxy)benzophenone.

References Cited in the file of this patent
UNITED STATES PATENTS
2,777,828    Day                   Jan. 15, 1957

OTHER REFERENCES
Chemical Abstracts I, vol. 38, col. 5247$^2$.
Chemical Abstracts II, vol. 50, col. 4224$^d$.